United States Patent
Yanagihara et al.

(10) Patent No.: US 7,000,375 B2
(45) Date of Patent: Feb. 21, 2006

(54) POLYESTER FALSE-TWIST YARN AND METHOD OF MANUFACTURING THE YARN

(75) Inventors: Masaaki Yanagihara, Matsuyama (JP); Yoshiki Shirakawa, Matsuyama (JP); Hiroyuki Osaka, Matsuyama (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/504,766

(22) PCT Filed: Dec. 19, 2002

(86) PCT No.: PCT/JP02/13318

§ 371 (c)(1),
(2), (4) Date: Aug. 17, 2004

(87) PCT Pub. No.: WO2004/057074

PCT Pub. Date: Jul. 8, 2004

(65) Prior Publication Data

US 2005/0102992 A1    May 19, 2005

(51) Int. Cl.
*D02G 3/22*    (2006.01)

(52) U.S. Cl. ...................................... 57/248
(58) Field of Classification Search .......... 57/243–248, 57/200; 264/168, 176.1, 177.1, 177.13, 177.14, 264/177.15, 211.12, 211.14; 428/397–401, 428/264

See application file for complete search history.

(56) References Cited

U.S. PATENT DOCUMENTS 4,976,097 A * 12/1990 Yanagihara et al. .......... 57/208

FOREIGN PATENT DOCUMENTS

| JP | 54-151617 A | 11/1979 |
|----|-------------|---------|
| JP | 61-31231 B2 | 7/1986 |
| JP | 61-31232 B2 | 7/1986 |
| JP | 62-45340 B2 | 9/1987 |
| JP | 2-112428 A | 4/1990 |
| JP | 2-112434 A | 4/1990 |
| JP | 2667152 B2 | 6/1997 |
| JP | 11-269718 A | 10/1999 |
| JP | 2002-38341 A | 2/2002 |
| JP | 2002-201541 A | 7/2002 |
| JP | 2002-266181 A | 9/2002 |

* cited by examiner

*Primary Examiner*—Gary L. Welch
*Assistant Examiner*—Shaun R. Hurley
(74) *Attorney, Agent, or Firm*—Sughrue Mion, PLLC (57) ABSTRACT

A polyester false-twist textured yarn, useful as a yarn for woven or knitted fabrics having excellent water-absorbing and quick drying properties, satisfies all of the requirements (1) to (3) shown below:

(1) the cross-sectional profiles of a plurality of individual filaments, from which the false-twist textured multifilament yarn is constituted, each have 3 to 6 concavities, and the average number of the concavities having a ratio (H/W) of a largest depth (H) to a largest width (W) of the individual concavities of 0.3 or more is in the range of from 50 to 80% of the total number of the concavities;

(2) the average of the cross-sectional profile flatness factors is in the range of from 1.5 to 3.5; and (3) the standard deviation of the cross-sectional profile flatness factors is in the range of from 0.3 to 1.0.

9 Claims, 3 Drawing Sheets

POLYESTER FALSE-TWIST YARN AND METHOD OF MANUFACTURING THE YARN

TECHNICAL FIELD

The present invention relates to a polyester false-twist textured yarn and a process for producing the same. The present invention relates in more detail to a polyester false-twist textured yarn excellent in water-absorption effects, washing durability and having a quick drying property, a good dry touch and being suitable as a yarn for fabrics, and a process for producing the same.

BACKGROUND ART

Polyester fibers have been widely used as fabric materials for clothing by utilizing the excellent properties of the fibers. As diversified and individualized clothing for daily life, and to make high grade clothing for daily life, various attempts have been made to impart preferable properties, that natural fibers have, such as a water-absorbing ability, to polyester fibers.

Furthermore, fabrics having a significantly quick drying property in addition to an enhanced water-absorption have come to be used for the application in sportswear such as athletic shirts or golf wear, so that the sportswear maintains a comfortable wearable state, even when the wearer sweats. For polyester fibers, an improvement in the fibers, in water-absorption and quick drying properties, is desired.

Conventional polyester false-twist textured yarns are rich in bulkiness, exhibit a high tensile strength and a good elongation property, and have excellent easy-care properties and a significant dry touch. The polyester false-twist textured yarns are therefore preferably used for application in clothing. However, attention has been paid in recent years to false-twist textured yarns excellent in a water-absorbing ability and the feeling given to the wearers. Demand for materials having a sweat-absorbing property and a quick drying property has been increasing in applications such as sportswear, shirts for soccer and athletic shirts in order for the sportswear to maintain a comfortable wearable state even when the wearers sweat.

However, synthetic fibers such as polyester fibers used as materials for false-twist textured yarns generally have a low water-absorbing ability, and therefore have the problem that they give an uncomfortable feeling to the wearers in applications in which they are directly contacted with the skin. A solution to the problem is therefore desired.

There is such a known method that imparts a water-absorbing ability to a polyester fiber as disclosed in Japanese Examined Patent Publication (Kokoku) No. 61-31231. The method comprises producing a hollow fiber from a polyester resin containing a sulfonic acid compound, and alkali treating a fabric prepared therefrom so that the sulfonic acid compound is eluted to form fine pores in the fiber cross-sectional profile, which fine pores impart a water-absorbing property to the polyester fibers. Moreover, Japanese Unexamined Patent Publication (Kokai) No. 54-151617 proposes a method wherein an oriented polyester yarn (called a flat yarn) having fiber cross-sectional profiles with slots and/or arm-like protrusions is produced from a polyester containing a metal sulfonate salt, and a water-absorbing fabric is produced therefrom. However, when such a hollow fiber or an oriented polyester yarn having cross-sectional profiles with slots and/or arm-like protrusions is false-twist textured, hollow portions, slots and arm-like protrusions are crushed. Consequently, there is no difference between the fiber cross-sectional profiles subsequent to false-twist texturing and those of a conventional false-twist textured yarn. A fabric produced from such a polyester false-twist textured yarn shows no adequate water-absorption even when treated with alkali. Moreover, when a fabric is formed from the hollow polyester fibers in a flat yarn form without false-twist texturing, the fabric manifests a water-absorption when treated with alkali. However, the fabric shows a poor moisture dissipation property, and the wearer has a wet and uncomfortable feeling after sweating.

Japanese Examined Patent Publication (Kokoku) No. 61-31232 discloses a method comprising false-twist texturing a polyester conjugate fiber having a core-in-sheath structure, producing a fabric therefrom, and alkali treating the fabric to elute a polyester in the core portion. However, production of a flat yarn having such a complicated structure is extremely difficult. The polyester false-twist textured yarn thus obtained becomes extremely expensive, and wide commercial use of the yarn is difficult.

Furthermore, Japanese Examined Patent Publication (Kokoku) No. 62-45340 and Japanese Patent Publication No. 2667152 disclose a technology, as a method of imparting a sweat-absorbing property and a quick drying property to a synthetic fiber fabric, wherein a multilayered structure fabric is produced from polyester fibers having concavities in fiber cross-sectional profiles, and absorbed water is introduced into gaps among the constituent individual fibers so that the quick drying property of the fabric is made significant. However, production of a fabric having such a special structure is costly, and the range of use is restricted. Moreover, when a polyester fiber having concavities in the fiber cross sectional profiles is false-twist textured, the cross-sectional profiles of the fibers are greatly deformed, and capillary gaps among individual fibers that bring about a capillary effect are often not formed.

Furthermore, Japanese Unexamined Patent Publication (Kokai) No. 11-269718 discloses a polyester false-twist textured yarn with a W-shaped cross section which has a fiber cross-sectional profile in a specific scope after false-twist texturing, and the water-absorption of which is not impaired. However, even when a polyester fiber having a W-shaped cross section that has heretofore been widely disclosed as a typical cross-sectional shape of a water-absorbing polyester fiber is false-twist textured by a known method, manifestation of sufficient water-absorption and quick drying property cannot be expected.

As explained above, a polyester false-twist textured yarn constituted from polyester fibers that have a highly irregular cross section, prepared by false-twist texturing the polyester fibers, and suitable for producing a fabric that manifests sufficient water-absorption and quick drying properties, and a process for producing the same are unknown.

DISCLOSURE OF THE INVENTION

An object of the present invention is to provide a polyester false-twist textured yarn suitable for producing fiber fabrics having an excellent water-absorption and an excellent quick drying property, and a process for producing the same.

As a result of intensively carrying out investigations to achieve the above object, the present inventors have discovered that a false-twist textured multifilament yarn constituted from polyester individual filaments having specific cross-sectional profiles can be obtained by simultaneously drawing and false-twisting a polyester undrawn yarn having specific cross-sectional profiles and dimensions under specific conditions and that a woven or knitted fabric having an excellent water-absorbing ability and an excellent fast drying property can be obtained from the false-twist textured yarn, and they have thus achieved the present invention.

The polyester false-twist textured yarn of the present invention comprises a false-twist textured yarn, of a multifilament yarn, comprising a polyester resin, wherein cross-sectional profiles of a plurality of individual filaments, from which the false-twist textured multifilament yarn is constituted, satisfy all of the requirements (1) to (3) shown below:

(1) the cross-sectional profiles of the plurality of individual filaments each have 3 to 6 convexities and 3 to 6 concavities formed between the convexities, and the average number of the concavities having a ratio (H/W) of a largest depth (H) of the individual concavities to a largest opening width of the individual concavities of 0.3 or more is in the range of from 50 to 80% of the total number of the concavities;

(2) an average flatness factor of the cross-sectional profiles of the plurality of individual filaments represented by ratios (L1/L2) of largest lengths (L1) of the cross-sectional profiles of the plurality of individual filaments to largest widths (L2) at right angles to the direction of the largest lengths (L1) is in the range from 1.5 to 3.5; and (3) a standard deviation of the flatness factors of the plurality of individual filaments is in the range of from 0.3 to 1.0.

In the polyester false-twist textured yarn of the present invention, the polyester resin preferably comprises, as a principal component, a polyester comprising, as principal repeating units, repeating ethylene terephthalate units.

In the polyester false-twist textured yarn of the present invention, the polyester resin preferably contains a fine pore-forming agent (1) synthesized by mixing, during the preparation procedure of the polyester resin, a metal-containing phosphorus compound represented by the general formula (1):

(1)

wherein $R^1$ and $R^2$, which may be the same as each other or different from each other, represent a mono-valent organic group, $M^1$ represents an alkali metal atom or an alkaline earth metal atom, and ma represents 1 when $M^1$ represents an alkali metal atom, or ½ when $M^2$ represents an alkaline earth metal atom, and an alkaline earth metal compound, into the preparation system of the polyester resin.

In the polyester false-twist textured yarn of the present invention, the polyester resin preferably contains a fine pore-forming agent (2) comprising at least one member selected from metal salts of aromatic sulfonic acids represented by the general formula (2):

(2)

wherein $R^3$ represents a hydrogen atom or ester-forming organic group, $M^2$ and $M^3$ respectively and independently from each other represent a metal atom, mb and mc respectively represent a reciprocal of the valance number of $M^2$ or $M^3$ corresponding to mb or mc, and n represents an integer of 1 or 2.

The process of the present invention for producing the polyester false-twist textured yarn comprises a melt spinning procedure in which a polyester resin is melted, the polyester resin melt is extruded through a plurality of spinning orifices into filamentary streams, the polyester resin filamentary streams are cooled and solidified; and the resultant undrawn polyester multifilament yarn is taken up, wherein the form of the spinning orifices and the melt-spinning conditions are controlled so that the form and dimensions of the cross-sectional profiles of a plurality of individual filaments from which the undrawn polyester multi-filament yarn is constituted, satisfy both of requirements (4) and (5) shown below:

(4) in each of the cross-sectional profiles of the plurality of undrawn individual filaments, 3 to 6 concavities are formed and the average of the ratios (Ha/Wa) of the largest depth (Ha) to the largest opening widths (Wa) of the individual concavities of the cross-sectional profiles are in the range of from 0.3 to 0.5; and (5) the average of cross-sectional profile flatness factors represented by the ratios (L1a/L2a) of the largest lengths (L1a) of the cross-sectional profiles of the plurality of undrawn individual filaments to the largest widths (L2a) at right angles to the directions of the largest lengths is in the range of from 1.0 to 1.5, and a simultaneous drawing and false-twist texturing procedure in which the undrawn polyester multifilament yarn is simultaneously drawn and false-twist textured, to prepare a drawn false-twist textured yarn, wherein the simultaneous drawing and false-twist texturing procedure is carried out under conditions satisfying both of the requirements (6) and (7) as shown below:

(6) the temperature of a first heater for the false-twisting procedure is adjusted in the range of from 30° C. to 100° C. below the melting temperature of the polyester resin; and (7) the false twist number per meter is adjusted in the range of from $25,000/D^{1/2}$ to $35,000/D^{1/2}$, wherein D represents a thickness in dtex of the yarn obtained by the simultaneous drawing and false-twist texturing procedure, to thereby produce the polyester false-twist textured yarn as claimed in claim 1.

In the process of the present invention for producing a polyester false-twist textured yarn, the polyester preferably comprises, as a principal component, a polyester comprising, as principal repeating units, repeating ethylene terephthalate units.

In the process of the present invention, for producing a polyester false-twist textured yarn, in the melt-spinning procedure, preferably, the taking up speed of the undrawn multifilament yarn is 2,500 to 4,000 m/min, and in the drawing and false-twist texturing procedure, the temperature of the first heater for the false-twist texturing is in the range of from 150 to 200° C.

In the process of the present invention for producing the polyester false-twist textured yarn, the polyester resin preferably contains a fine pore-forming agent (1) synthesized by mixing, during the preparation procedure of the polyester resin, a metal-containing phosphorus compound represented by the general formula (1):

(1)

wherein $R^1$ and $R^2$, which may be the same as or different from each other, represent a mono-valent organic group, $M^1$ represents an alkali metal atom or an alkaline earth metal atom, and ma represents 1 when $M^1$ represents an alkali metal atom, or ½ when $M^2$ represents an alkaline earth metal atom, and an alkaline earth metal compound, into the preparation system of the polyester resin.

In the process of the present invention for producing a polyester false-twist textured yarn, the polyester resin preferably contains a fine pore-forming agent (2) comprising at least one member selected from metal salts of aromatic sulfonic acids represented by the general formula (2):

(2)

wherein $R^3$ represents a hydrogen atom or ester-forming organic group, $M^2$ and $M^3$ respectively and independently from each other a metal atom, mb and mc respectively represent a reciprocal of the valance number of $M^2$ or $M^3$ corresponding to mb or mc, and n represents an integer of 1 or 2.

BEST MODE FOR CARRYING OUT THE INVENTION

The polyester false-twist textured yarn of the present invention is obtained by false-twist texturing polyester multifilaments having irregular cross-sectional profiles. Although there is no specific restriction on the types of polyester resins used for forming the polyester multifilaments, the polyester resin preferably contains, as a principal component, a polyester containing, as principal repeating units, repeating ethylene terephthalate units, containing more preferably 85% by mole or more of repeating ethylene terephthalate units, still more preferably 95% by mole or more of repeating ethylene terephthalate units based on the total repeating units. Such a polyester may contain repeating units different from repeating ethylene terephthalate units and containing, as ester-forming components, 15% by mole or less or preferably 5% by mole or less of an aromatic dicarboxylic acid that differs from terephthalic acid and an organic diol compound that differs from ethylene glycol, in addition to the above repeating ethylene terephthalate units.

The intrinsic viscosity (measured at 35° C. with o-chlorophenol used as a solvent) of the polyester polymer usable for the present invention is preferably the same intrinsic viscosity of a polyester used as that of a fabric materials for usual clothings, that is, the intrinsic viscosity is preferably 0.7 or less. Moreover, the polyester resin may contain at least one of the known additives such as pigments, dyes, delustering agents, stainproof agents, luminescent brighteners, flame retardants, stabilizing agents, ultraviolet-ray absorbers and lubricants.

The polyester resin preferably contains a fine pore-forming agent (1) synthesized by mixing, during the synthesis procedure of the polyester resin, a metal-containing phosphorus compound represented by the general formula (1):

(1)

wherein $R^1$ and $R^2$, which may be the same as each other or different from each other, represent a mono-valent organic group [which is preferably selected from, for example, an alkyl group, an aryl group, an aralkyl group or a —[$(CH_2)_l$ O$]_k R^4$ group (wherein $R^4$ represents a hydrogen atom, an alkyl group, an aryl group or an aralkyl group, l represents an integer of 2 or more, and k represents an integer of 1 or more), $M^1$ represents an alkali metal atom or an alkaline earth metal atom, and is preferably selected from Li, Na, K, Mg, Ca, Sr and Ba, particularly preferably Ca, Sr, and Ba, and ma is a reciprocal of the valance number of a metal atom represented by $M^1$, and ma represents 1 when $M^1$ represents an alkali metal atom, or 1/2 when $M^1$ represents an alkaline earth metal atom, and (b) an alkaline earth metal compound, into the synthetic reaction system of the polyester resin.

There is no specific limitation to the alkaline earth metal compound used in combination with the metal-containing phosphorus compound, as long as the alkaline earth metal compound reacts with the metal-containing phosphorus compound to form a salt that is insoluble in the polyester. Examples of the alkaline earth metal compound include organic carboxylic acid salts of alkaline earth metals such as acetic acid salts, oxalic acid salts, benzoic acid salts, phthalic acid salts and stearic acid salts, inorganic acid salts of alkaline earth metals such as boric acid salts, silicic acid salts, carbonic acid salts and hydrogencarbonates, halogen compounds of alkaline earth metals such as chlorides, chelate compounds of alkaline earth metals (such as complex salts of ethylenediaminetetraacetic acid), hydroxides or oxides of alkaline earth metals, alcoholates such as methylates, ethylates and glycolates of alkaline earth metals, and phenolates of alkaline earth metals. In particular, use of organic carboxylic acid salts, halogen compounds, chelate compounds and alcoholates that are soluble in ethylene glycol is preferred. Of these compounds, organic carboxylic acid salts are particularly preferred.

The fine pore-forming agent (1) formed from the metal-containing phosphorus compound and the alkaline earth metal compound added during the preparation procedure of the polyester is eluted in an aqueous alkali compound solution with which the polyester fiber product produced from the polyester false-twist textured yarn is treated. As a result, fine pores, approximately uniformly distributed on the surfaces, in the interior and in the cross-sectional profiles of the filaments and extending along the axial direction of the filaments, are formed. Because such fine pores absorb irregular reflection of light taking place on the surface and interior of the polyester false-twist textured yarn, the fine pores manifest the effect of increasing a color density in the dyed fabric. In particular, in the surface of the polyester false-twist textured yarn that is highly shape-modified or flattened, and the surface of which irregularly reflects light much, the fine pores effectively act to improve the feeling and increase the color strength.

The effect of increasing a color strength caused by the fine pores in the dyed fabric is clearly manifested when the total molecular amount of the metal-containing compound and the alkaline earth metal compound is in the range of from 0.5 to 3.0% by mole based on the total molecular amount of the acid components of the polyester, and is particularly preferably manifested when the total molecular amount is in the range of from 0.6 to 2.0% by mole. Moreover, the addition amount of the alkaline earth metal compound is preferably in the range of from 0.5 to 1.2 times the molecular amount of the metal-containing phosphorus compound and, particularly preferably, is in the range of from 0.5 to 1.0 times the molecular amount.

As explained above, for the polyester false-twist textured yarn containing a fine pore-forming agent (1) that is formed from a metal-containing phosphorus compound and an alkaline earth metal compound, the cross-sectional profiles of the yarn can be most favorably designed to impart a water-absorbing ability and a fast drying property to the yarn while the effect of significantly increasing the color strength of the dyed fabric is being maintained.

In order to form fine pores that are approximately uniformly scattered in the cross-sectional profiles of the yarn and that extend in the axial direction of the yarn when the false-twist textured yarn product of the present invention is treated with an aqueous alkali compound solution, the false-twist textured yarn of the invention may be made to contain, as a fine pore-forming agent (2), a metal sulfonate represented by the general formula (2):

(2)

wherein $M^2$ and $M^3$ respectively and independently from each other represent, preferably, an alkali metal atom, an alkaline earth metal atom, a manganese atom, a cobalt atom or a zinc atom, $R^3$ represents a hydrogen atom or an ester-forming functional group, n represents an integer of 1 or 2, and mb and mc respectively represent a reciprocal of the valance number of $M^2$ or $M^3$ corresponding to mb or mc. Metal salts of sulfonic acids mentioned in, for example, Japanese Examined Patent Publication (Kokoku) No. 61-31231 can be preferably used as those for such a fine pore-forming agent (2). Examples of the metal salts of sulfonic acids include sodium 3-carbomethoxybenzene-sulfonate-sodium 5-carboxylate and sodium 3-hydroxy-ethoxycarbonylbenzenesulfonate-½ magnesium 5-carboxylate.

The fine pore-forming agent (2) containing a metal sulfonate of the formula (2) may be added to the polyester resin at any stage prior to melt spinning the polyester. For example, the fine pore-forming agent (2) may be added during the preparation procedure of the polyester resin. The fine pore forming agent (2) is added in an amount in the range of preferably from 0.3 to 15% by mole, particularly preferably from 0.5 to 5% by mole based on the total mole of the acid components from which the polyester is constituted.

A plurality of individual polyester filaments, from which the polyester false-twist textured yarn of the invention is constituted, have cross-sectional profiles that simultaneously satisfy the requirements (1) to (3) shown below:

(1) the cross-sectional profiles of the plurality of individual filaments each have 3 to 6 convexities and 3 to 6 concavities formed between the convexities, and the average number of the concavities having a ratio (H/W) of a largest depth (H) of the individual concavities to a largest opening width (W) of the individual concavities of 0.3 or more is in the range of from 50 to 80% of the total number of the concavities;

(2) an average of the flatness factors of the cross-sectional profiles of individual filaments represented by ratios (L1/L2) of largest lengths (L1) of the cross-sectional profiles of the plurality of individual filaments to largest widths (L2) at right angles to the direction of the largest lengths (L1) is in the range of from 1.5 to 3.5; and (3) a standard deviation of the flatness factors of the cross-sectional profiles of the plurality of individual filaments is in the range of from 0.3 to 1.0.

Figure 1:
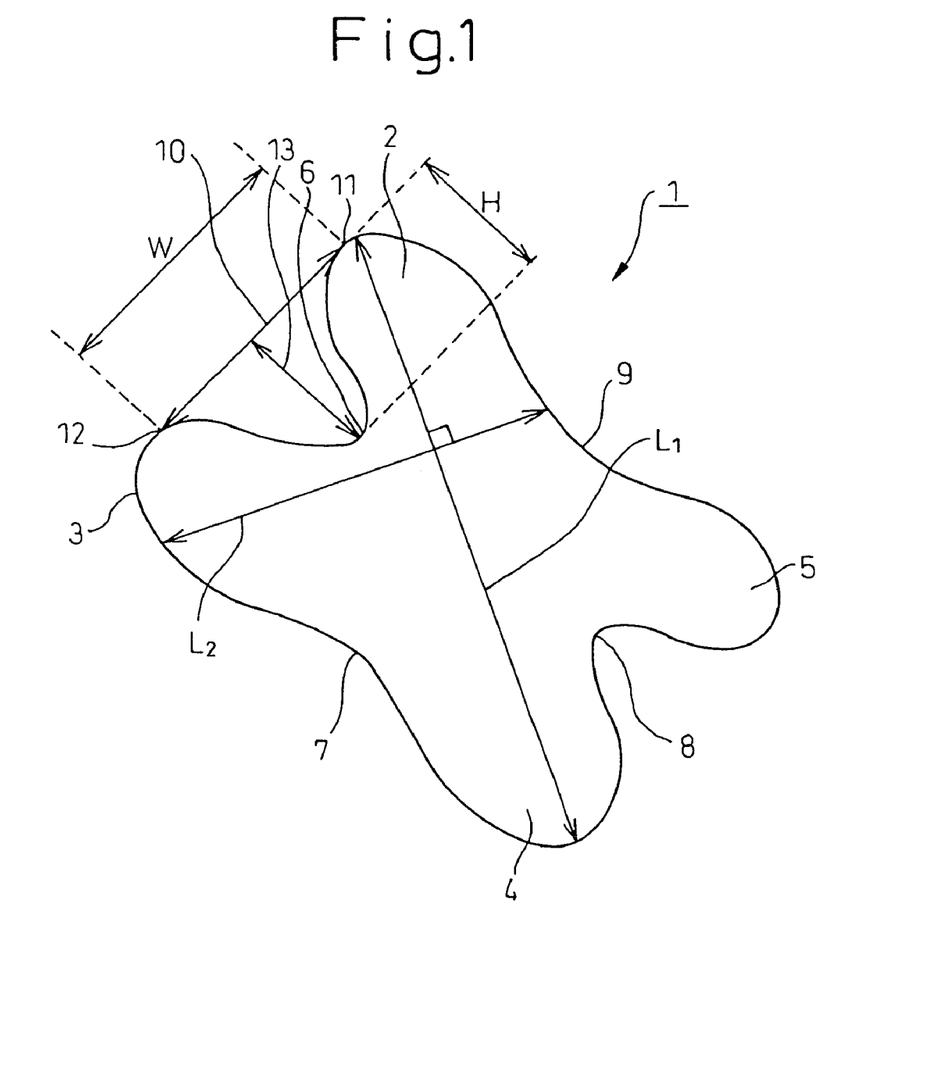
FIG. 1 is an explanatory view showing one example of a cross-sectional profile of one of the individual filaments from which the polyester false-twist textured yarn of the present invention is constituted.

FIG. 1 shows one example of the cross-sectional profiles of individual polyester filaments from which the polyester false-twist textured yarn of the present invention is constituted. The individual filament 1 in FIG. 1 has four convexities (protruded portions) 2, 3, 4 and 5 and four concavities 6, 7, 8 and 9.

In FIG. 1, one concavity 6 is formed between two convexities 2, 3. When a tangent 10 that is contacted with the protruded portions of the convexities 2, 3 is drawn, the tangent 10 is contacted with the convexities 2, 3 at contacts 11, 12. The spacing between the contacts 11, 12 is the largest opening width W of the concavity 6. Moreover, the length of the largest line segment 13 of line segments vertical to the tangent 10 drawn from the tangent 10 toward the bottom portion of the concavity 6 represents the largest depth H of the concavity 6. The largest opening width and the largest depth of each of the concavities 7, 8, 9 are similarly measured, and the H/W ratios are calculated.

For the cross-sectional profile shown in FIG. 1, the concavities 6, 8 each have an H/W ratio of 0.3 or more, and the concavities 7, 9 each have an H/W ratio of less than 0.3. Accordingly, for the cross-sectional profile in FIG. 1, the number of concavities, each having an H/W ratio of 0.3 or more, of 2 corresponds to 50% when the total number of concavities is 4.

When the number of concavities is 4, the number of concavities each having an H/W ratio of 0.3 or more that satisfies the above requirement (1) is 2 (50%) or 3 (75%).

When the largest length L1 and the largest width L2 at right angles to the direction of the largest length (L1) of the cross-sectional profile in FIG. 1 are measured, the cross-sectional profile flatness factor (L1/L2) can be calculated. The L1/L2 ratio in the cross-sectional profile in FIG. 1 is about 1.6.

Figure 2:
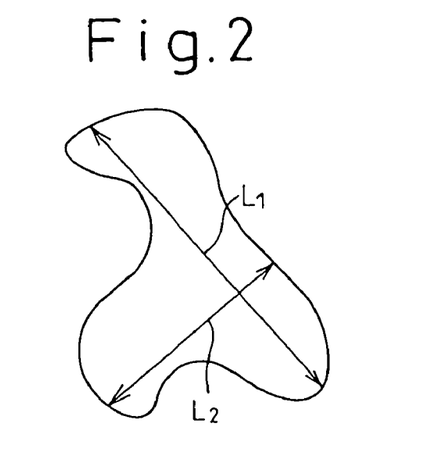
FIG. 2 is an explanatory view showing another example of a cross-sectional profile of one of the individual filaments from which the polyester false-twist textured yarn of the present invention is constituted.

FIG. 2 shows one example of the cross-sectional profiles of individual filaments having 3 concavities. Of the three concavities contained in the profile in FIG. 2, two concavities have an H/W ratio of 0.3 or more. The number ratio is therefore $2/3 \times 100 = 66.7\%$, and the cross-sectional profile flatness factor is about 1.6.

Figure 3:
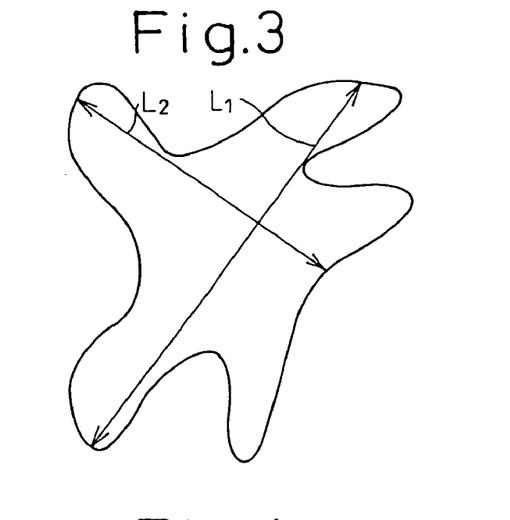
FIG. 3 is an explanatory view showing another example of a cross-sectional profile of one of the individual filaments from which the polyester false-twist textured yarn of the present invention is constituted.

FIG. 3 shows one example of the cross-sectional profiles of individual filaments having 5 concavities. Of the five concavities contained in the cross-sectional profile in FIG. 3, three concavities have an H/W ratio of 0.3 or more. The number ratio is therefore $3/5 \times 100 = 60\%$, and the cross-sectional flatness factor is about 1.5.

Figure 4:
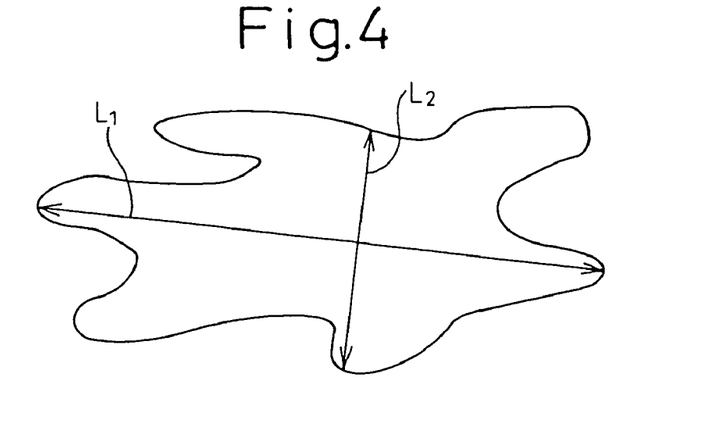
FIG. 4 is an explanatory view showing another example of a cross-sectional profile of one of the individual filaments from which the polyester false-twist textured yarn of the present invention is constituted.

FIG. 4 shows one example of the cross-sectional profiles of individual filaments having six concavities. Of the six concavities contained in the cross-sectional profile in FIG. 4, four concavities have an H/W ratio of at least 0.3. The number ratio is therefore $4/6 \times 100 = 66.7\%$, and the cross-sectional profile flatness factor is about 2.4.

For a cross-sectional profile of undrawn individual filaments, the Ha/Wa ratios and the cross-sectional profile flatness factor $L1a/L2a$ can be calculated in the same manner as explained above.

That is, for the requirement (1) of the polyester false-twist textured yarn of the present invention, 3 to 6 convexities (protruded portions) and 3 to 6 concavities formed between the convexities, preferably 3 to 4 convexities (protruded portions) and 3 to 4 concavities formed therebetween are formed in each of the cross-sectional profiles of the plurality of individual filaments, and in the plurality of cross-sectional profiles, the average number of the concavities each having a ratio (H/W) of a largest depth (H) of the concavity to a largest opening width (W) of the concavity of 0.3 or more is in the range of from 50 to 80%, preferably from 60 to 70% of the total number of the concavities in the cross-sectional profiles.

When the number of the concavities in each of the cross-sectional profiles is from 1 to 2, formation of gaps among individual filaments in the false-twist textured yarn thus obtained becomes insufficient, and manifestation of a capillary effect becomes inadequate. Moreover, when the number of the concavities is 7 or more, it becomes impossible to make the number of concavities each having an H/W ratio of 0.3 or more 50% or more of the total number of the concavities.

Furthermore, when the average of the number concavities each having an H/W ratio of 0.3 or more is less than 50% of the total number of the concavities in the entire fiber cross-sectional profiles, the concavities of individual filaments in the false-twist textured yarn obtained inadequately manifest a capillary effect on water absorption. When the woven or knitted fabric is produced from the false-twist textured yarn, the product thus obtained has an insufficient water-absorbing ability and an inadequate fast drying property.

On the other hand, when the average of the number of concavities each having an H/W ratio of 0.3 or more exceeds 80% of the total number of the concavities of the fiber cross-sectional profiles, an impact force applied to the convexities of the individual filaments during false-twisting often damages the concavities. As a result, many cracks are formed in the concavities to flatten the surface shapes of the individual filaments, and the capillary effect is inadequately manifested. When a woven or knitted fabric is prepared from the false-twist textured yarn, the product thus obtained has an insufficient water-absorbing property and an inadequate fast drying property.

For the requirement (2) of the polyester false-twist textured yarn of the present invention, when the average of the flatness factors of the cross-sectional flatness profiles is in the range of from 1.5 to 3.5, the capillary effect caused by the concavities along the individual filament axes is manifested. As a result, water sticking to the individual filament surfaces can be rapidly diffused in the longitudinal axial direction of the filaments. Moreover, suitable gaps among individual filaments are formed in this case, and the sticking water is rapidly evaporated away. In addition, when the flatness factor of the cross-sectional profile is in the range of from 2 to 3, a preferred capillary effect is manifested.

When the average of the flatness factors of the cross-sectional profiles exceeds 3.5, the cross-sectional profiles of the individual filaments are often deformed during the false-twist texturing procedure to make the depths of the concavities shallow. As a result, the capillary effect is insufficiently manifested, and gaps among the fiber individual filaments become small, and transpiration of sticking water on the individual filament surfaces becomes slow. Moreover, when the average of the flatness factors of the cross-sectional profiles is less than 1.5, the concavities of individual filaments are often fitted together. As a result, gaps among the individual filaments also become small, and transpiration of sticking water on the individual filament surfaces is hindered.

Furthermore, for the requirement (3) of the polyester false-twist textured yarn of the invention, the cross-sectional profiles of the individual filaments must be varied among the individual filaments and along the longitudinal axes thereof so that the standard deviation of the cross-sectional profile flatness factors becomes from 0.3 to 1.0, preferably from 0.4 to 0.8. When the standard deviation of the flatness factor of the cross-sectional profiles is less than 0.3, the cross-sectional profiles of the polyester false-twist textured yarn becomes uniform. As a result, gaps among the individual filaments become small, and the evaporation of sticking water on the individual filament surfaces is hindered. Moreover, the individual filaments contacted with each other are often fitted together in the concavities. As a result, gaps among individual filaments become small, and transpiration of sticking water on the individual filament surfaces is hindered. Moreover, when the standard deviation of the flatness factor of the cross-sectional profiles exceeds 1.0, a change in the cross-sectional profiles of the individual filaments along the longitudinal axes thereof becomes excessive. As a result, when a physical impact is applied to the polyester false-twist textured yarn during a procedure such as weaving or knitting, the constituent individual filaments tend to be cracked in the longitudinal direction to damage the cavities and decrease the capillary effect. Moreover, yarn breakage and fluff formation often take place in during a procedure such as weaving or knitting.

The polyester false-twist textured yarn of the present invention can be supplied to a knitting or weaving procedure to give knitted or woven fabrics, preferably woven fabrics. When the woven or knitted fabrics thus obtained contain a fine pore-forming agent, alkali reduction of the fabrics makes the fine pore-forming agent elute in the treating solution from the polyester textured yarns, and the agent is removed. As a result, fine pores, distributed in the surfaces and cross sections of the filaments and extending along the longitudinal axes of the individual filaments, are formed. Of such fine pores, fine pores distributed in the surfaces of the filaments in particular decrease the contact angle of water drops sticking to the filaments to show the effect of making the water drops rapidly penetrate the entire filament surfaces. Accordingly, a water-absorbing property and a quick drying property can be imparted to the woven or knitted fabrics formed from the polyester false-twist textured yarns of the present invention by alkali reduction alone without hydrophilic treatment. In addition, hydrophilic treatment of the woven or knitted fabrics having been subjected to hydrophilic treatment can further improve the water-absorbing property and the fast drying property thereof.

The polyester false-twist textured yarn of the present invention can be produced by, for example, the following process.

Figure 5:
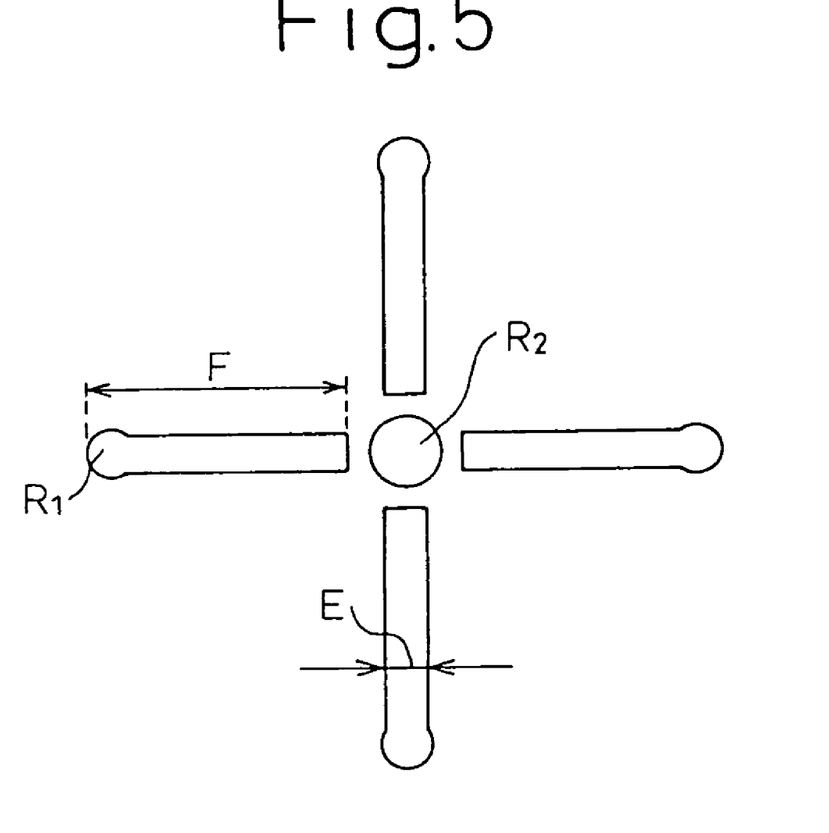
FIG. 5 is an explanatory view showing one embodiment of an extrusion orifice for melt spinning for producing the polyester false-twist textured yarn of the present invention.

That is, a melt spinning procedure wherein a polyester resin, for example, a polyester resin containing as a principal component a polyester polymer substantially composed of ethylene terephthalate units is dried, the dried polyester resin is melted with a melt extruding machine such as an extruder and extruded in filamentary streams through a spinneret that has many extrusion orifices each composed of, for example, a plurality of slits arranged as shown in FIG. 5, the extruded filamentary streams are cooled and solidified, and the resultant filaments are taken up at, for example, a speed of 2,500 to 4,000 m/min to produce an undrawn polyester multifilament yarn constituted from a plurality of undrawn individual filaments having fiber cross-sectional profiles that simultaneously satisfy both of the requirements (4) and (5) shown below:

(4) in each of the cross-sectional profiles of the plurality of undrawn individual filaments, 3 to 6 concavities are formed and the average of the ratios (Ha/Wa) of the largest depths (Ha) to the largest opening widths (Wa) of the concavities of the cross-sectional profiles are in the range of from 0.3 to 0.5; and (5) the average of cross-sectional profile flatness factors represented by the ratios (L1a/L2a) of the largest lengths (L1a) of the cross-sectional profiles of the plurality of undrawn individual filaments to the largest widths (L2a) at right angles to the directions of the largest lengths is in the range of from 1.0 to 1.5.

The spinning orifice usable for the melt spinning procedure in the process of the present invention has a plurality of slits. FIG. 5 shows one embodiment of a spinning orifice for producing an undrawn individual filament having, for example, 4 concavities.

In FIG. 5, a spinning orifice 20 is constituted from a circular small hole 21 formed in the central portion of the spinning orifice and having a diameter of $R_2$, and four radially arranged slots 22, 23, 24 and 25. The outside end portion of each slot is rounded in an arc form. In FIG. 5, 4 slots 22 to 25 are arranged at mutually equiangular intervals. However, the angular intervals, width E, length F and diameter $R_1$ of the rounded outside end portion of the slots and the diameter $R_2$ of the small circular hole 21 can be suitably designed according to a desired cross-sectional profile.

The cross-sectional profile of an undrawn individual filament extruded from the spinning orifice 20 shown in FIG. 5 has an approximately round central portion and 4 convexities extended therefrom at angular intervals of 90°. When such an undrawn multifilament yarn is supplied to a drawing and false-twisting procedure to be described later, the cross-sectional profile of the undrawn individual filament is irregularly deformed to become a profile, for example, as shown in FIG. 1.

When the polyester resin is a polyester polymer having ethylene terephthalate units as the principal repeating units in the melt spinning procedure of the process in the present invention, the taking-up speed of the cooled and solidified undrawn multifilament yarn is preferably from 2,500 to 4,000 m/min.

When the spinning speed is less than 2,500 m/min in the above case, the polyester multifilaments are embrittled and yarn breakage often may take place in the drawing and false-twisting procedure which will be explained later. Moreover, when the spinning speed exceeds 4,000 m/min, the false-twist textured yarn obtained by the drawing and false-twisting procedure may have fluffs formed thereon.

Furthermore, the number of concavities of each of the cross-sectional profiles of the individual filaments in the undrawn polyester multifilament yarn can be freely set by changing the number of spinning slits constituting each spinning orifice. When the number of concavities is from 1 to 2, the magnitudes of gaps among individual filaments in the false-twist textured yarn thus obtained become insufficient, and the capillary effect is insufficiently manifested. On the other hand, when the number of concavities is 7 or more, the number of concavities having an H/W ratio of 0.3 or more becomes 50% or less of the total number of the concavities in the drawn individual filament cross-sectional profile of the false-twist textured yarn thus obtained.

Furthermore, when the average of the Ha/Wa ratios of the concavities of the cross-sectional profiles of individual filaments in the undrawn polyester multifilament yarn is less than 0.3, the number of concavities having an H/W ratio of 0.3 or more in the individual filament cross-sectional profiles of the false-twist textured yarn thus obtained becomes 50% or less of the total number of the concavities. On the other hand, when the average of the Ha/Wa ratios of the concavities of undrawn individual filament cross-sectional profiles exceeds 0.5, the average of cross-sectional profile flatness factors of the drawn individual filaments of the false-twist textured yarn thus obtained exceeds 3.5, or the standard deviation of the cross-sectional profile flatness factors exceeds 1.0.

Furthermore, when the flatness factors of the cross-sectional profiles of undrawn polyester individual filaments exceed 1.5, the average of the flatness factors of the drawn individual filaments of the false-twist textured yarn thus obtained exceeds 3.5, or the standard deviation of the flatness factors of the cross-sectional profiles exceeds 1.0. When the average of the flatness factors of the cross-sectional profiles of the undrawn polyester individual filaments is less than 1.0, the average of the flatness factors of the cross-sectional profiles of the drawn individual filaments of the false-twist textured yarn thus obtained becomes less than 1.5.

In the process of the present invention, an undrawn polyester yarn produced by the above melt spinning procedure is simultaneously drawn and false-twist textured with a drawing and false-twisting machine. Use of a false-twisting unit, in which a friction disc is incorporated, for the drawing and false-twisting machine can increase the false-twisting speed. In addition, two heaters are installed in some of the conventional drawing and false-twisting machines at the front site and the back site of the false-twisting unit, respectively (the heater at the front site being referred to as the first heater, and the heater at the back site being referred to as the second heater). However, in the process of the present invention, the first heater alone is preferably used, or a texturing machine having the first heater alone is preferably used.

In the present invention, in order to produce a polyester false-twist textured yarn that satisfies the requirements (1) to (3), the simultaneous drawing and false-twist texturing procedure must be carried out under conditions satisfying both of the requirements (6) and (7) as shown below:

(6) the temperature of a first heater for the false-twisting procedure is adjusted in the range of from 30° C. to 100° C. (preferably from 40° C. to 90° C.) below the melting temperature of the polyester resin; and (7) the false twist number (twist number/m) is adjusted in the range of from $25,000/D^{1/2}$ to $35,000/D^{1/2}$, preferably from $28,000/D^{1/2}$ to $33,000/D^{1/2}$, wherein D represents a thickness in dtex of the yarn obtained by the simultaneous drawing and false-twist texturing procedure, to thereby produce the polyester false-twist textured yarn.

When a difference between the temperature of the first heater and the melting temperature of the polyester resin exceeds 100° C., the deformation of the cross-sectional profiles of the undrawn individual filaments caused by the drawing and false-twist texturing procedure is too small. As a result, in the resultant polyester false-twist textured yarn, the average of the flatness factors of the cross-sectional profiles becomes less than 1.5, or the number of the concavities that have an H/W ratio of 0.3 or more becomes less than 50% based on the total number of the concavities, is obtained. On the other hand, when a difference between the temperature of the first heater and the melting temperature of the polyester resin is less than 30° C., deformation of the cross-sectional profiles of the undrawn individual filaments caused thereby becomes excessively large. As a result, the average of the flatness factors of the cross-sectional profiles exceeds 3.5, or the standard deviation of the flatness factors of the cross-sectional profiles exceeds 1.0. Moreover, in the drawing and false-twist texturing procedure, partial melt sticking, among individual filaments, takes place. Consequently, the polyester false-twist textured yarn thus obtained is harsh and has a significantly rough feel, and becomes poor in quality.

Furthermore, when the false twist number (turns/m) in the drawing and false-twisting procedure is less than $25,000/D^{1/2}$, deformation of the cross-sectional profiles of the undrawn individual filaments caused by drawing and false-twist texturing procedure becomes insufficient. As a result, in the resultant polyester false-twist textured yarn, the average of the flatness factors of the cross-sectional profiles becomes less than 1.5, or the number of the concavities that have H/W ratios of 0.3 or more becomes less than 50% based on the total number of the concavities is obtained. Moreover, the polyester false-twist textured yarn thus obtained has inadequate crimping property. Furthermore, when the number of false-twisting (times/m) exceeds $35,000/D^{1/2}$, the average of the flatness factors of the cross-sectional profiles of the polyester false-twist textured yarn exceeds 3.5, or the standard deviation of the flatness factors of the cross-sectional profiles exceeds 1.0. Moreover, individual filaments are easily broken during the drawing and false-twist texturing procedure, and yarn breakage often occurs during the drawing and false-twist texturing procedure. As a result, many fluffs are observed in the resultant polyester false-twist textured yarn.

EXAMPLES

The present invention will be further explained by the following examples. In addition, measurements were made in the examples on undrawn filaments and drawn and false-twisted filaments by the following methods.

(1) H/W Ratio or Ha/Wa Ratio

From an undrawn polyester multifilament yarn or a false-twist textured polyester multifilament yarn, 10 cross-sectional samples in total were taken by cutting the yarn at intervals of 10 m along the longitudinal axis, and each of the cross sections was microscopically photographed. A depth H (FIG. 1) or Ha and an opening width W (FIG. 1) or Wa of each concavity of the photographed yarn cross sections were measured, and an H/W ratio or an Ha/Wa ratio was calculated. The number of concavities each having an H/W ratio or an Ha/Wa ratio of 0.3 or more was counted, and the ratio (%) of the counted number to the total number of concavities was calculated.

(2) Cross-Sectional Profile Flatness Factor

From an undrawn polyester multifilament yarn or a false-twist textured polyester multifilament yarn, 10 cross-sectional samples in total were taken by cutting the yarn at intervals of 10 m along the longitudinal axis, and each of the cross sections was microscopically photographed. A largest length L1 and a largest width L2 vertically crossing the major axis having the largest length L1 were measured on each of the cross-sectional profiles of the photographed yarn cross sections, and an L1/L2 ratio was calculated. The cross-sectional profile flatness factor was represented by the average of the entire measured values. Moreover, the standard deviation of the cross-sectional profile flatness factors was calculated on the samples of the individual filaments of the polyester false-twist textured yarn.

(3) Wicking Property

The wicking value (sec) of a woven fabric sample was measured in accordance with JIS L 1907-5.1.1 (drop method).

(4) Water-Absorbing Property (Byreck Method)

In accordance with JIS L 1018-Method B, one end of a woven fabric sample having a width of 2.5 cm is immersed in water, and the height of absorbed water was measured 10 minutes after the immersion.

(5) Crimp Ratio (TC %)

A sample of a polyester false-twist textured yarn was wound around a hank frame under a tension of 0.044 cN/(thickness (dtex) of the false-twist textured yarn) to give a hank having a thickness of about 3,300 dtex.

Two loads, 0.00177 cN/dtex and 0.177 cN/dtex, were applied to one end of the hank, and the length $S_0$ (cm) is measured 1 minute after the loading. The sample is then treated with boiling water at 100° C. for 20 minutes after the load of 0.177 cN/dtex was removed from the hank.

The remaining load of 0.00177 cN/dtex was removed from the hank after the boiling water treatment, and the sample was naturally dried for 24 hours in a relaxed condition without load. The two loads, 0.00177 cN/dtex and 0.177 cN/dtex, were applied to the hank again, and the length $S_1$ (cm) was measured 1 minute after the loading. The load of 0.177 cN/dtex was then removed, and the length $S_2$ was measured 1 minute after the load was removed. The percentage of crimp was calculated in accordance with the following equation:

Percentage of crimp $(\%)=[(S_1-S_2)/S_0]\times 100$

The average of 10 measured values is calculated.

Example 1

A poly(ethylene terephthalate) polymer (melting temperature: 253° C.) was dried, melted at 290° C., extruded through a spinneret having 24 spinning orifices into filamentary streams, and cooled and solidified. An oiling agent was applied to the resultant filaments, and the filaments were wound at a speed of 3,000 m/min. An undrawn polyester multifilament yarn having a yarn count of 135 dtex/24 filaments in which the cross-sectional profiles of individual filaments each had 4 concavities, was obtained. The undrawn polyester multifilaments each exhibited an Ha/Wa ratio of 0.4 and a cross-sectional profile flatness factor (L1/L2) of 1.2. The 24 spinning orifices of the spinneret each had, referring to FIG. 5, a central small circular hole ($R_2$=0.39 mm), and 4 slots ($R_1$=0.14 mm, E=0.10 mm, F=0.70 mm) arranged at equiangular intervals of 90 degrees.

The undrawn polyester multifilament yarn was supplied to a drawing and false-twisting machine equipped with a false-twisting unit in which a urethane rubber friction disc was arranged on three axes, and simultaneously drawn and false twisted under the following conditions: a draw ratio of 1.65; a first heater temperature of 170° C.; drawing, false-twisting and taking-up speed of 600 m/min; and a value of false twist number×$D^{1/2}$ of about 30,000. The resultant drawn and false-twist textured polyester yarn had the thickness, the percentage of crimps, a cross-sectional profile flatness factor, the standard deviation of cross-sectional profile flatness factor and the ratio of a number of concavities having an H/W ratio of 0.3 or more to a total number of concavities as shown in Table 1, and also had a yarn count of 84.0 dtex/24 filaments.

A plain weave fabric having a gray fabric warp density of 80 yarns/25.4 mm and a weft density of 80 yarns/25.4 mm was produced from the drawn, false-twist textured polyester yarn. The plain weave fabric was scoured and then relaxed at 80° C. for 20 minutes, and pre-set at 180° C. for 45 seconds. The woven fabric was then dyed at 130° C. for 45 minutes in an aqueous dyeing bath containing a disperse dye of a navy blue color, and was final-set at 160° C. for 45 minutes. A woven fabric sample for evaluation was obtained. Measurements of a wicking property and a water-absorbing property (Byreck method) were applied to the woven fabric sample, and the measurement results are shown in Table 1.

Examples 2 to 4

In each of Examples 2 to 4, the same procedures as in Example 1 were repeated except that the first heater temperature of the drawing and false-twisting machine and the value of a false twist number×$D^{1/2}$ were changed as shown in Table 1, to prepare a false-twist textured polyester yarn having the properties as shown in Table 1.

The polyester false-twist textured yarns thus obtained were woven under the same conditions as in Example 1. The resultant fabrics were processed to give woven fabric samples for evaluation. Measurements of the wicking property and water-absorbing ability (Byreck method) were applied to the woven fabric samples. The measurement results are shown in Table 1.

Comparative Examples 1 to 2

In each of Comparative Examples 1 to 2, the same procedures as in Example 1 were repeated except that the first heater temperature of the drawing and false-twisting machine and the value of a false twist number×$D^{1/2}$ were changed as shown in Table 1. A polyester false-twist textured yarn having the properties as shown in Table 1, was obtained.

The polyester false-twist textured yarns thus obtained were woven under the same conditions as in Example 1. The resultant fabrics were processed to provide woven fabric samples for evaluation. Measurements of the wicking property and water-absorbing ability (Byreck method) were applied to the woven fabric samples. The measurement results are shown in Table 1.

During the weaving procedure in Comparative Example 2, the weaving machine was often caused to stop because the polyester false-twist textured yarn had many fluffs.

TABLE 1

|  |  | Ex. 1 | Ex. 2 | Ex. 3 | Ex. 4 | C. Ex. 1 | C. Ex. 2 |
|---|---|---|---|---|---|---|---|
| False-twisting conditions | First heater temp. (° C.) | 170 | 160 | 170 | 190 | 145 | 200 |
|  | Set value of (false twist number × $D^{1/2}$) | 30000 | 28000 | 25000 | 33000 | 25000 | 36000 |
|  | Measured value of false twist number (turns/m) | 3291 | 3069 | 2748 | 3605 | 2740 | 3943 |
|  | Measured value of (false twist number × $D^{1/2}$) | 30160 | 28180 | 25170 | 33140 | 25130 | 36220 |
| Properties of polyester false-twist textured yarn | Thickness (dtex) | 84.0 | 84.3 | 83.9 | 84.5 | 84.1 | 84.4 |
|  | Percentage of Crimps (%) | 18 | 16 | 15 | 20 | 12 | 23 |
|  | Flatness factor of cross-sectional profile | 2.5 | 1.8 | 1.6 | 3.3 | 1.3 | 3.6 |
|  | Standard deviation of flatness factors of cross-sectional profiles | 0.6 | 0.5 | 0.4 | 0.8 | 0.6 | 1.3 |

TABLE 1-continued

|  |  | Ex. 1 | Ex. 2 | Ex. 3 | Ex. 4 | C. Ex. 1 | C. Ex. 2 |
|---|---|---|---|---|---|---|---|
|  | Percentage of number of concavities having an H/W ratio of 0.3 or more (%) | 65 | 54 | 51 | 67 | 41 | 64 |
| Evaluation of water-absorbing property and quick drying property | Wicking property (sec) | 4 | 7 | 8 | 7 | 21 | 26 |
|  | Water-absorption by Byreck method (cm) | 21.5 | 14.0 | 15.9 | 15.0 | 8 | 9 |

Note:
D represents the thickness (dtex) of a false-twist textured yarn.

Example 5

In a transesterification vessel, 100 parts by mass of dimethyl terephthalate, 60 parts by mass of ethylene glycol and 0.06 part by mass (0.066% by mole based on dimethyl terephthalate) of calcium acetate monohydrate were placed. The resultant reaction mixture was heated from 140° C. to 230° C. over a time period of 4 hours in a nitrogen atmosphere while the methanol thus generated was distilled off to effect a transesterification reaction. Separately from the above reaction, 0.5 part by mass of trimethyl phosphate (0.693% by mole based on dimethyl terephthalate) and 0.31 part by mass of calcium acetate monohydrate (½ times the molar amount of trimethyl phosphate) were reacted in 8.5 parts by mass of ethylene glycol while the entire reaction mixture was being refluxed at 120° C. for 60 minutes to prepare 9.31 parts by mass of a transparent solution of a calcium salt of phosphoric acid diester. In the transparent solution, 0.57 part by mass of calcium acetate monohydrate (0.9 times the mole number of trimethyl phosphate) was dissolved in at room temperature to prepare 9.88 parts by mass of a transparent solution mixture of a calcium salt of phosphoric acid diester and calcium acetate. The transparent solution mixture was added to the transesterification reaction products, and then 0.04 part by mass of antimony trioxide was added thereto. The reaction mixture thus obtained was transferred to a polymerization reactor. The pressure within the reactor was reduced from 101 kPa (760 mm Hg) to 133 Pa (1 mm Hg) over a time period of one hour and, simultaneously, the polymerizer temperature was increased from 230° C. to 285° C. over a time period of one hour and 30 minutes. The polymerization was further carried out under a reduced pressure of 133 Pa (1 mm Hg) or less at a polymerization temperature of 285° C. for 3 hours (4 hours and 30 minutes in total) to provide a polyester having an intrinsic viscosity of 0.641 (measured at 35° C. with o-chlorophenol used as a solvent). After completion of the reaction, the polyester thus obtained was formed into polyester chips.

The polyester chips were dried, melted at 290° C., extruded through a spinneret having 24 spinning orifices into filamentary streams, and cooled and solidified. An oiling agent was applied to the resultant filaments, and the filaments were wound up at a speed of 3,000 m/min to provide an undrawn polyester multifilament yarn (undrawn polyester filaments) having a yarn count of 135 dtex/24 filaments in which each cross-sectional profile each of individual filaments had 4 concavities. The undrawn polyester multifilaments had an average Ha/Wa ratio of 0.4 and a cross-sectional profile flatness factor (L1/L2) of 1.2. The 24 spinning orifices of the spinneret each had, referring to FIG. 5, a central small circular hole ($R_2$=0.30 mm), and 4 slots ($R_1$=0.14 mm, E=0.10 mm, F=0.70 mm) arranged at equiangular intervals.

The undrawn polyester multifilament yarn obtained in the above melt spinning procedure was supplied to a drawing and false-twisting machine equipped with a false-twisting unit in which a urethane rubber friction disc was arranged on three axes, and simultaneously drawn and false twisted under the following conditions: a draw ratio of 1.65; a first heater temperature of 170° C.; a drawing, false-twisting and taking-up speed of 600 m/min; and a value of false twist number×$D^{1/2}$ of about 30,000. The polyester false-twist textured yarn thus obtained exhibited the thickness, the percentage of crimps, the cross-sectional profile flatness factor, the standard deviation of cross-sectional profile flatness factor and the ratio of a number of concavities having an H/W ratio of 0.3 or more to a total number of concavities, as shown in Table 2. The yarn had a yarn count of 84.2 dtex/24 filaments.

A plain weave fabric having a gray fabric warp density of 80 yarns/25.4 mm and a weft density of 80 yarns/25.4 mm was produced. The plain weave fabric was scoured and then relaxed at 80° C. for 20 minutes, and pre-set at 180° C. for 45 sec. The fabric was then subjected to a weight reduction treatment in a 3.5% aqueous sodium hydroxide solution at boiling temperature so that the weight reduction became 20% by weight. The fabric thus obtained was dyed at 130° C. for 45 minutes in a dyeing bath containing a disperse dye of a black color, and was final set at 160° C. for 45 sec to provide a woven fabric sample for evaluation. Measurements of a bathochromic effect (K/S), a wicking property and a water-absorbing ability (Byreck method) were made on the woven fabric sample. The measurement results are shown in Table 2.

Examples 6 to 7, Comparative Examples 3 to 4

In each of Examples 6 to 7, and Comparative Examples 3 to 4, a polyester false-twist textured yarn having the properties shown in Table 2 was produced in the same manner as in Example 5 except that the first heater temperature of the drawing and false-twisting machine and the value of a false-twisting number×$D^{1/2}$ were changed as shown in Table 1.

The polyester false-twist textured yarns thus obtained were woven under the same conditions as in Example 5, and the woven fabrics were processed to provide woven fabric samples for evaluation. Measurements of a bathochromic effect (K/S), a wicking property and a water-absorbing ability (Byreck method) were applied to the woven fabric samples. The measurement results are shown in Table 2. Because the polyester false-twist textured yarn of Comparative Example 4 had many fluffs, the weaving machine was often stopped during the weaving procedure.

circular hole ($R_2=0.30$ mm), and 4 slots ($R_1=0.14$ mm, E=0.10 mm, F=0.70 mm) arranged at equiangular intervals of 90 degrees.

The undrawn polyester multifilament yarn was supplied to a drawing and false-twisting machine equipped with a false-twisting unit in which a urethane rubber friction disc

TABLE 2

| | | Ex. 5 | Ex. 6 | Ex. 7 | C. Ex. 3 | C. Ex. 4 |
|---|---|---|---|---|---|---|
| False-twisting conditions | First heater temp. (° C.) | 175 | 165 | 190 | 145 | 205 |
| | Set value of (false twist number × $D^{1/2}$) | 30000 | 28000 | 33000 | 28000 | 36000 |
| | Measured value of false twist number (turns/m) | 3300 | 3080 | 3610 | 3040 | 3960 |
| | Measured value of (false twist number × $D^{1/2}$) | 30250 | 28230 | 33110 | 27950 | 36250 |
| Properties of polyester false-twist textured yarn | Thickness (dtex) | 84.0 | 84.0 | 84.1 | 84.5 | 83.8 |
| | Percentage of Crimp (%) | 21.3 | 18.2 | 21.0 | 14.2 | 23.1 |
| | Flatness factor of cross-sectional profile | 2.6 | 1.7 | 3.4 | 1.4 | 3.8 |
| | Standard deviation of flatness factors of cross-sectional profiles | 0.6 | 0.4 | 0.9 | 0.5 | 1.3 |
| | Percentage of number of concavities having an H/W ratio of 0.3 or more (%) | 63 | 53 | 66 | 40 | 63 |
| Evaluation of water-absorbing property and quick drying property of woven fabric | Bathochromic shift (K/S) | 25.3 | 26.7 | 25.4 | 24.4 | 18.5 |
| | Wicking value (sec) | 5 | 8 | 9 | 20 | 25 |
| | Water-absorption by Byreck method (cm) | 22.1 | 15.2 | 15.9 | 9.6 | 8.6 |

Note:
D represents the thickness (dtex) of a false-twist textured yarn.

Example 8

A poly(ethylene terephthalate) composition (having a melting temperature of 250° C.) prepared by mixing a poly(ethylene terephthalate) polymer and disodium 3-carbomethoxybenzenesulfonato-5-carboxylate in an amount of 0.62% by mole based on the terephthalic acid component of the poly(ethylene terephthalate) and having an intrinsic viscosity of 0.635 (determined in o-chlorophenol used as a solvent, at 35° C.) was dried, melted at 290° C., extruded through a spinneret having 24 spinning orifices into filamentary streams, and cooled and solidified. An oiling agent was applied to the resultant filaments, and the filaments were wound up at a speed of 3,000 m/min to provide an undrawn polyester multifilament yarn (undrawn polyester filaments) having a yarn count of 135 dtex/24 filaments of which the cross-sectional profiles each had 4 concavities. The undrawn polyester multifilaments exhibited an average of Ha/Wa ratios of all the concavities of 0.4 and the average of cross-sectional profile flatness factors (L1a/L2a) of 1.2. The 24 spinning orifices of the spinneret each had a central small was arranged on three axes, and simultaneously drawn and false twisted under the following conditions: a draw ratio of 1.65; a first heater temperature of 170° C.; drawing, false-twisting and taking-up speed of 600 m/min; and a value of false twist number×$D^{1/2}$ of about 30,000. The resultant polyester false-twist textured yarn exhibited the thickness, the percentage of crimps, the cross-sectional profile flatness factor, the standard deviation of cross-sectional profile flatness factor and the ratio of a number of concavities having an H/W ratio of 0.3 or more to a total number of concavities as shown in Table 3. The yarn had a yarn count of 84.0 dtex/24 filaments was produced.

A plain weave fabric having a gray fabric warp density of 80 yarns/25.4 mm and a weft density of 80 yarns/25.4 mm was produced from the polyester false-twist textured yarn. The plain weave fabric was scoured and then relaxed at 80° C. for 20 minutes, and pre-set at 180° C. for 45 sec. The woven fabric was then subjected to a weight reduction treatment in an aqueous 3.5% sodium hydroxide solution at the boiling temperature so that the weight reduction of the fabric becames 20% by weight. The woven fabric thus obtained was dyed at 130° C. for 45 minutes in a dyeing bath containing a disperse dye of a navy blue color, and final set at 160° C. for 45 sec to provide a woven fabric sample for evaluation. Measurements of a wicking property and a water-absorbing ability (Byreck method) were applied to the woven fabric sample. The measurement results are shown in Table 3.

Examples 9 to 11

In each of Examples 9 to 11, a polyester false-twist textured yarn having the properties shown in Table 3 was produced in the same manner as in Example 8 except that the first heater temperature of the drawing and false-twisting machine and the value of a false-twisting number×$D^{1/2}$ were changed as shown in Table 3.

The polyester false-twist textured yarns were woven and processed in the same manner as in Example 8 to provide woven fabric samples for evaluation. Measurements of a wicking property and a water-absorbing ability (Byreck method) were applied to the woven fabric samples. The measurement results are shown in Table 3.

Comparative Examples 5 to 6

In each of Comparative Examples 9 to 11, a polyester false-twist textured yarn having the properties as shown in Table 3 was produced in the same manner as in Example 8 except that the first heater temperature of the drawing and false-twisting machine and the value of a false-twisting number×$D^{1/2}$ were changed as shown in Table 3.

The polyester false-twist textured yarns were woven and processed in the same manner as in Example 8 to provide woven fabric samples for evaluation. Measurements of a wicking property and a water-absorbing ability (Byreck method) were applied to the woven fabric samples. The measurement results are shown in Table 3.

In Comparative Example 6, the resultant polyester false-twist textured yarn had many fluffs, and thus the weaving machine was often stopped during the weaving procedure.

TABLE 3

| | | Ex. 8 | Ex. 9 | Ex. 10 | Ex. 11 | C. Ex. 5 | C. Ex. 6 |
|---|---|---|---|---|---|---|---|
| False-twisting conditions | First heater temp. (° C.) | 170 | 160 | 170 | 190 | 140 | 205 |
| | Set value of (false twist number × $D^{1/2}$) | 30000 | 28000 | 25000 | 33000 | 26000 | 36000 |
| | Measured value of false twist number (turns/m) | 3280 | 3070 | 2740 | 3620 | 2840 | 3950 |
| | Measured value of (false twist number × $D^{1/2}$) | 30060 | 28120 | 25140 | 33240 | 26050 | 36250 |
| Properties of polyester false-twist textured yarn | Thickness (dtex) | 84.0 | 83.9 | 84.2 | 84.3 | 84.1 | 84.2 |
| | Percentage of Crimps (%) | 18 | 14 | 13 | 21 | 14 | 22 |
| | Flatness factor of cross-sectional profile | 2.6 | 1.7 | 1.5 | 3.4 | 1.4 | 3.7 |
| | Standard deviation of flatness factors of cross-sectional profiles | 0.6 | 0.4 | 0.3 | 0.9 | 0.5 | 1.2 |
| | Percentage of number of concavities having an H/W ratio of 0.3 or more (%) | 64 | 53 | 50 | 66 | 40 | 65 |
| Evaluation of water-absorbing property and quick drying property of woven fabric | Wicking property (sec) | 4 | 8 | 7 | 9 | 20 | 25 |
| | Water-absorption by Byreck method (cm) | 23.2 | 15.2 | 16.3 | 15.9 | 9.6 | 10 |

Note:
D represents the thickness (dtex) of a false-twist textured yarn.

INDUSTRAIL APPLICABILITY

The polyester false-twist textured yarn of the present invention is a useful material for producing woven or knitted fabrics manifesting excellent water-absorbing and quick drying properties under conventional woven or knitted fabric-texturing conditions. Such a polyester false-twist textured yarn can be produced by the process of the present invention with high efficiency.

The invention claimed is:

1. A polyester false-twist textured yarn comprising a false-twist textured yarn, of a multifilament yarn, comprising a polyester resin, wherein cross-sectional profiles of a plurality of individual filaments, from which the false-twist textured multifilament yarn is constituted, satisfy all of the requirements (1) to (3) shown below:

(1) the cross-sectional profiles of the plurality of individual filaments each have 3 to 6 convexities and 3 to 6 concavities formed between the convexities, and the average number of the concavities having a ratio (H/W) of a largest depth (H) of the individual concavities to a largest opening width of the individual concavities of 0.3 or more is in the range of from 50 to 80% of the total number of the concavities;

(2) an average flatness factor of the cross-sectional profiles of the plurality of individual filaments represented by ratios (L1/L2) of largest lengths (L1) of the cross-sectional profiles of the plurality of individual filaments to largest widths (L2) at right angles to the direction of the largest lengths (L1) is in the range from 1.5 to 3.5; and (3) a standard deviation of the flatness factors of the plurality of individual filaments is in the range of from 0.3 to 1.0.

2. The polyester false-twist textured yarn as claimed in claim 1, wherein the polyester resin comprises, as a principal component, a polyester comprising, as principal repeating units, repeating ethylene terephthalate units.

3. The polyester false-twist textured yarn as claimed in claim 1, wherein the polyester resin contains a fine pore-forming agent (1) synthesized by mixing, during the preparation procedure of the polyester resin, (a) a metal-containing phosphorus compound represented by the general formula (1):

(1)

wherein $R^1$ and $R^2$, which may be the same as each other or different from each other, represent a mono-valent organic group, $M^1$ represents an alkali metal atom or an alkaline earth metal atom, and ma represents 1 when $M^1$ represents an alkali metal atom, or 1/2 when $M^2$ represents an alkaline earth metal atom, and (b) an alkaline earth metal compound into the preparation system of the polyester resin.

4. The polyester false-twist textured yarn as claimed in claim 1, wherein the polyester resin contains a fine pore-forming agent (2) comprising at least one member selected from metal salts of aromatic sulfonic acids represented by the general formula (2):

(2)

wherein $R^3$ represents a hydrogen atom or ester-forming organic group, $M^2$ and $M^3$ respectively and independently from each other represent a metal atom, mb and mc respectively represent a reciprocal of the valance number of $M^2$ or $M^3$ corresponding to mb or mc, and n represents an integer of 1 or 2.

5. A process for producing the polyester false-twist textured yarn comprising a melt spinning procedure in which a polyester resin is melted, the polyester resin melt is extruded through a plurality of spinning orifices into filamentary streams, the polyester resin filamentary streams are cooled and solidified; and the resultant undrawn polyester multifilament yarn is taken up, wherein the form of the spinning orifices and the melt-spinning conditions are controlled so that the form and dimensions of the cross-sectional profiles of a plurality of individual filaments from which the undrawn polyester multi-filament yarn is constituted, satisfy both of requirements (4) and (5) shown below:

(4) in each of the cross-sectional profiles of the plurality of undrawn individual filaments, 3 to 6 concavities are formed and the average of the ratios (Ha/Wa) of the largest depth as (Ha) to the largest opening widths (Wa) of the individual concavities of the cross-sectional profiles are in the range of from 0.3 to 0.5; and (5) the average of cross-sectional profile flatness factors represented by the ratios (L1a/L2a) of the largest lengths (L1a) of the cross-sectional profiles of the plurality of undrawn individual filaments to the largest widths (L2a) at right angles to the directions of the largest lengths is in the range of from 1.0 to 1.5, and a simultaneous drawing and false-twist texturing procedure in which the undrawn polyester multifilament yarn is simultaneously drawn and false-twist textured, to prepare a drawn false-twist textured yarn, wherein the simultaneous drawing and false-twist texturing procedure is carried out under conditions satisfying both of the requirements (6) and (7) as shown below:

(6) the temperature of a first heater for the false-twisting procedure is adjusted in the range of from 30° C. to 100° C. below the melting temperature of the polyester resin; and (7) the false twist number per meter is adjusted in the range of from $25,000/D^{1/2}$ to $35,000/D^{1/2}$, wherein D represents a thickness in dtex of the yarn obtained by the simultaneous drawing and false-twist texturing procedure, to thereby produce the polyester false-twist textured yarn as claimed in claim 1.

6. The process for producing a polyester false-twist textured yarn as claimed in claim 5, wherein the polyester comprises, as a principal component, a polyester comprising, as principal repeating units, repeating ethylene terephthalate units.

7. The process for producing a polyester false-twist textured yarn as claimed in claim 6 wherein, in the melt-spinning procedure, the taking up speed of the undrawn multifilament yarn is 2,500 to 4,000 m/min, and in the drawing and false-twist texturing procedure, the temperature of the first heater for the false-twist texturing is in the range of from 150 to 200° C.

8. The process for producing the polyester false-twist textured yarn as claimed in claim 5, wherein the polyester resin contains a fine pore-forming agent (1) synthesized by mixing, during the preparation procedure of the polyester resin, a metal-containing phosphorus compound represented by the general formula (1):

(1)

wherein $R^1$ and $R^2$, which may be the same as or different from each other, represent a mono-valent organic group, $M^1$ represents an alkali metal atom or an alkaline earth metal atom, and ma represents 1 when $M^1$ represents an alkali metal atom, or 1/2 when $M^2$ represents an alkaline earth metal atom, and an alkaline earth metal compound into the preparation system of the polyester resin.

9. The process for producing a polyester false-twist textured yarn as claimed in claim 7, wherein the polyester resin contains a fine pore-forming agent (2) comprising at least one member selected from metal salts of aromatic sulfonic acids represented by the general formula (2):

(2)

wherein $R^3$ represents a hydrogen atom or ester-forming organic group, $M^2$ and $M^3$ respectively and independently from each other represent a metal atom, mb and mc respectively represent a reciprocal of the valance number of $M^2$ or $M^3$ corresponding to mb or mc, and n represents an integer of 1 or 2.

* * * * *